(12) United States Patent
Qian et al.

(10) Patent No.: US 11,330,705 B2
(45) Date of Patent: May 10, 2022

(54) METHOD, SYSTEM AND APPARATUS FOR DETECTING POLARITY OF COMPONENT, AND COMPUTER-READABLE STORAGE MEDIUM

(71) Applicant: VAYO (SHANGHAI) TECHNOLOGY CO., LTD., Shanghai (CN)

(72) Inventors: Shengjie Qian, Shanghai (CN); Yongjian Qu, Shanghai (CN); Jishuo Liu, Shanghai (CN); Fengshou Liu, Shanghai (CN)

(73) Assignee: VAYO (SHANGHAI) TECHNOLOGY CO., LTD., Shanghai (CN)

( * ) Notice: Subject to any disclaimer, the term of this patent is extended or adjusted under 35 U.S.C. 154(b) by 81 days.

(21) Appl. No.: 16/648,635

(22) PCT Filed: Dec. 28, 2017

(86) PCT No.: PCT/CN2017/119359
§ 371 (c)(1),
(2) Date: Mar. 18, 2020

(87) PCT Pub. No.: WO2019/075920
PCT Pub. Date: Apr. 25, 2019

(65) Prior Publication Data
US 2020/0288568 A1    Sep. 10, 2020

(30) Foreign Application Priority Data

Oct. 19, 2017 (CN) .......................... 201710980261.8

(51) Int. Cl.
*G06T 7/00* (2017.01)
*H05K 1/02* (2006.01)
*G01R 31/28* (2006.01)

(52) U.S. Cl.
CPC ....... *H05K 1/0269* (2013.01); *G01R 31/2801* (2013.01); *G06T 7/001* (2013.01); *G06T 2207/30141* (2013.01)

(58) Field of Classification Search
CPC ...... G06F 17/212; G06F 21/32; G06F 17/276; G06F 17/505; G06F 17/5022;
(Continued)

(56) References Cited

U.S. PATENT DOCUMENTS

| 6,480,394 | B1 | 11/2002 | Feld et al. | |
| 9,946,918 | B2* | 4/2018 | Kazdaghli | .......... G06K 9/00087 |
| 2016/0062954 | A1* | 3/2016 | Ruff | ....................... G06F 40/205 |
| | | | | 715/249 |

FOREIGN PATENT DOCUMENTS

| CN | 102192715 A | 9/2011 |
| CN | 102682166 A | 9/2012 |

(Continued)

*Primary Examiner* — Phuoc H Doan
(74) *Attorney, Agent, or Firm* — Tianhua Gu; Global IP Services

(57) ABSTRACT

The present disclosure provides a method, system and apparatus for detecting polarity of component, and a computer-readable storage medium. The component polarity detection method includes: selecting first component symbols similar to graphs in a pre-created template library of component polarity symbols from a polar graph layer of a to-be-detected printed circuit board (PCB), and sifting out second component symbols each having polarity from the selected first component symbols; and traversing each second component symbol having polarity, to detect whether a polarity symbol that has been already stored in the template library is in the second component symbol having polarity; if yes, examining whether a polarity position of the polarity symbol in the second component symbol is correct; and if the polarity position is incorrect, outputting a report indi- (Continued)

cating that the polarity position of the polarity symbol in the second component symbol is incorrect.

10 Claims, 5 Drawing Sheets

(58) Field of Classification Search
CPC .............. G06F 40/205; G06K 9/00087; G06K 9/6202; G06K 9/6215; H04L 51/046; H04L 29/08; H04L 51/02; H05K 1/0269; G06T 7/001; G01R 31/2801
USPC ...................................... 382/115; 705/37, 35
See application file for complete search history.

(56) References Cited

FOREIGN PATENT DOCUMENTS

| | | |
|---|---|---|
| CN | 106204602 A | 12/2016 |
| CN | 106370671 A | 2/2017 |
| JP | 04133500 A | 5/1992 |
| TW | 381182 B | 2/2000 |
| TW | 201423088 A | 6/2014 |

\* cited by examiner

METHOD, SYSTEM AND APPARATUS FOR DETECTING POLARITY OF COMPONENT, AND COMPUTER-READABLE STORAGE MEDIUM

CROSS REFERENCE TO RELATED PATENT APPLICATION

The present application is the US national stage of PCT/CN2017/119359 filed on Dec. 28, 2017, which claims the priority of CN201710980261.8 filed on Oct. 19, 2017, which applications are incorporated herein by reference.

BACKGROUND

Field of Disclosure

The present disclosure relates to the technical field of electronic component polarity detection, specifically to a detection method and system, and in particular to a method, system and apparatus for detecting polarity of component, and a computer-readable storage medium.

Description of Related Arts

With the advancement of intelligentization of the electronic industry, a printed circuit board (PCB) manufacturability examination and analysis technology becomes necessary for electronic enterprises to ensure product quality and implement agile manufacturing, and is used throughout all processes of development, trial-manufacturing, testing, production, and maintenance. In the design of PCB, the polarity direction of some components (for example, an integrated circuit (IC), an aluminum capacitor, a diode, and the like) are required. Therefore, how to examine whether a component has polarity and examine a direction will also be required in the PCB manufacturability analysis technology. At present, in the electronic industry, polarities of components are all checked by using a manual method, that is, an engineer manually checks whether each component in a wiring diagram has an identifier for confirmation. However, the manual check method has the following disadvantages: it is inefficient and time consuming; and the error rate is high. Therefore, how to create an intelligent polarity examination method in the PCB manufacturability examination and analysis technology becomes particularly necessary.

Therefore, how to provide a method, system and apparatus for detecting polarity of component, and a computer-readable storage medium, to overcome the disadvantages of low efficiency, long time consumed, high error rate, and the like due to confirmation of a component polarity through manual detection actually has become a technical problem to be resolved urgently by those skilled in the art.

SUMMARY OF THE PRESENT DISCLOSURE

The present disclosure provides a method, system and apparatus for detecting polarity of component, and a computer-readable storage medium, to resolve problems of low efficiency, long time consumed, and high error rate due to confirmation of a component polarity through manual detection.

The present disclosure provides a component polarity detection method. The method includes: selecting first component symbols similar to graphs in a pre-created template library of component polarity symbols from a polar graph layer of a to-be-detected printed circuit board (PCB), and sifting out second component symbols each having polarity from the selected first component symbols; and traversing each second component symbol having polarity, to detect whether a polarity symbol that has been already stored in the template library is in the second component symbol having polarity; if yes, examining whether a polarity position of the polarity symbol in the second component symbol is correct; and if the polarity position is incorrect, outputting a report indicating that the polarity position of the polarity symbol in the second component symbol is incorrect.

In an embodiment of the present disclosure, before selecting the first component symbols similar to the graphs in the pre-created template library of the component polarity symbols from the polar graph layer of the to-be-detected PCB, the component polarity detection method further includes: creating the template library of the component polarity symbols.

In an embodiment of the present disclosure, a graph similarity between a component symbol in the polar graph layer of the to-be-detected PCB and the selected first component symbol reaches a similarity threshold.

In an embodiment of the present disclosure, the component polarity detection method further includes: sifting out the second component symbols each having polarity from the selected first component symbols according to an attribute of a bill of material (BOM); or sifting out the second component symbols each having polarity from the selected first component symbols according to a name prefix of a received component.

In an embodiment of the present disclosure, detecting that the polarity symbol that has been already stored in the template library is not in the second component symbol having polarity includes: no polarity symbol is in the second component symbol having polarity; or a polarity symbol that has not been stored in the template library is in the second component symbol having polarity.

In an embodiment of the present disclosure, if no polarity symbol is in the second component symbol having polarity, outputting a report indicating a lack of the polarity symbol; or if the polarity symbol that has not been stored in the template library is in the second component symbol having polarity, outputting an addition instruction to add the polarity symbol that has not been stored to the template library.

In an embodiment of the present disclosure, examining whether the polarity position of the polarity symbol in the second component symbol is correct includes: determining whether the second component symbol is a bi-pin component symbol; if the second component symbol is a bi-pin component symbol, examining whether the polarity position of the polarity symbol in the second component symbol is correct according to the polarity symbol and the polarity direction of the bi-pin component symbol; if the polarity position is correct, continuing to examine whether the polarity position of the polarity symbol in the next second component symbol is correct; and if the polarity position is incorrect, outputting a report indicating that the polarity position of the polarity symbol in the second component symbol is incorrect; if the second component symbol is not a bi-pin component symbol, detecting whether the polarity symbol and a polarity pin of a non-bi-pin component symbol are located in a same location area, to examine whether the polarity position of the polarity symbol of the second component symbol is correct; if the polarity symbol and the polarity pin are located in the same location area, determining that the polarity position of the polarity symbol of the second component symbol is correct; if the polarity symbol and the polarity pin are not located in the same location area, determining that the polarity position of the polarity symbol of the second component symbol is incorrect, and outputting a report indicating that the polarity position of the polarity symbol of the second component symbol is incorrect; the polarity pin is the first pin of a non-bi-pin component by default.

The present disclosure further provides a component polarity detection system, including a selection module and a processing module. The selection module selects first component symbols similar to graphs in a pre-created template library of component polarity symbols from a polar graph layer of a to-be-detected printed circuit board (PCB), and sifts out second component symbols each having polarity from the selected first component symbols. The processing module traverses each second component symbol having polarity, to detect whether a polarity symbol that has been already stored in the template library is in the second component symbol having polarity; if yes, the processing module examines whether a polarity position of the polarity symbol in the second component symbol is correct; and if the polarity position is incorrect, the processing module outputs a report indicating that the polarity position of the polarity symbol in the second component symbol is incorrect.

The present disclosure further provides a computer-readable storage medium storing a computer program, when executed by a processor, the program implements the component polarity detection method above-mentioned.

The present disclosure further provides an apparatus, including a processor and a memory, the memory stores a computer program, and the processor executes the computer program stored in the memory, to cause the apparatus to perform the component polarity detection method above-mentioned.

As described above, the component polarity detection method and system, the computer-readable storage medium, and the apparatus of the present disclosure have the following beneficial effects:

The component polarity detection method and system, the computer-readable storage medium, and the apparatus of the present disclosure improve component polarity detection efficiency, shorten the detection time, have a low error rate, and play an important role in promoting intelligentization of the electronic industry.

Figure 1:
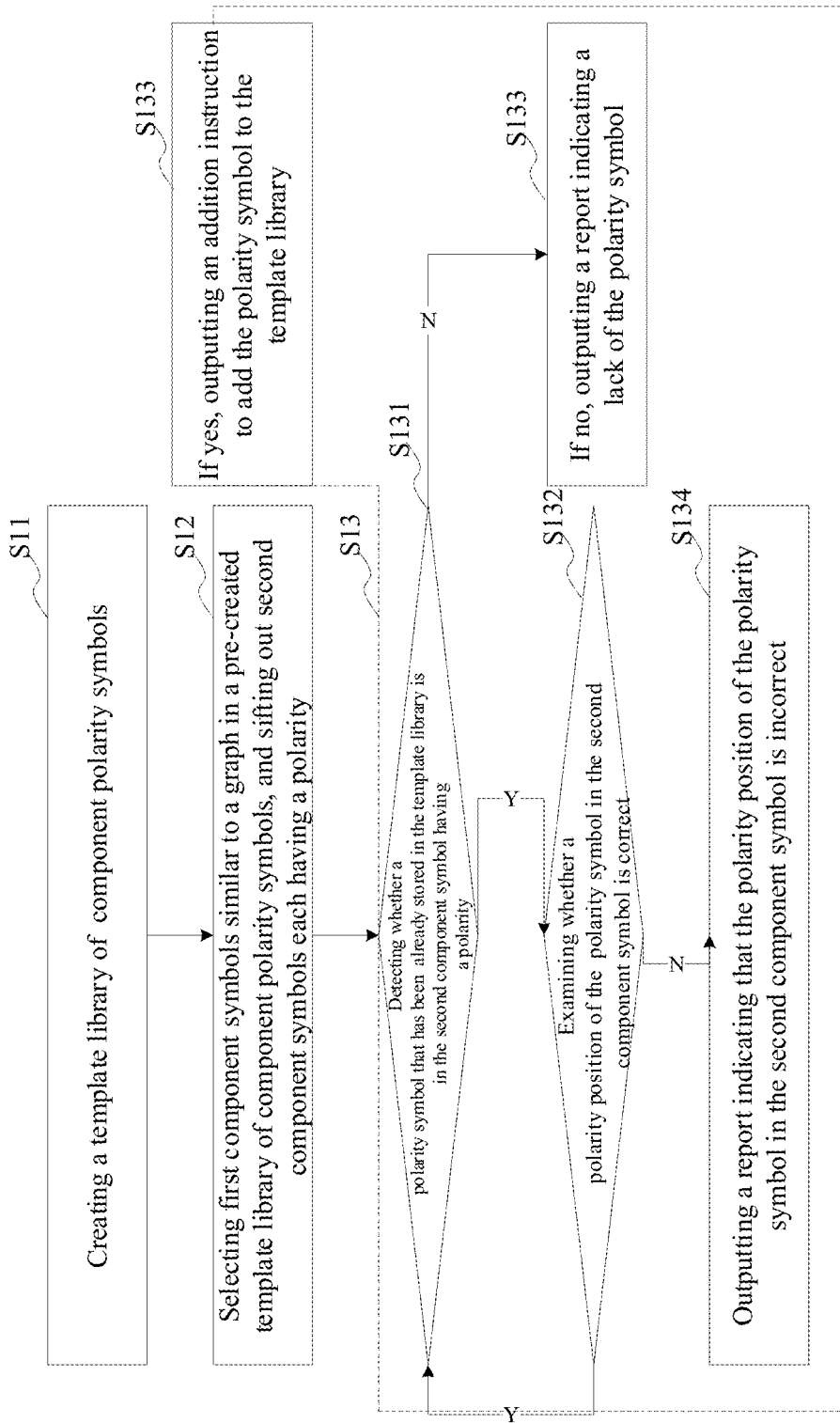
FIG. 1 is a schematic flowchart of a component polarity detection method according to an embodiment of the present disclosure.

| Descriptions of reference numerals | |
|---|---|
| 4 | Component polarity detection system |
| 41 | Template library creation module |
| 42 | Selection module |
| 43 | Processing module |
| S11 to S13 | Operations |
| S131 to S134 | Operations |

DETAILED DESCRIPTION OF THE PREFERRED EMBODIMENTS

The embodiments of the present disclosure will be described below through specific embodiments. One skilled in the art can easily understand other advantages and effects of the present disclosure according to contents disclosed by the description. The present disclosure can also be implemented or applied through other different specific implementation modes. Various modifications or changes can also be made to all details in the description based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrate components only related to the present disclosure and are not drawn according to the numbers, shapes and sizes of components during actual implementation, the configuration, number and scale of each component during actual implementation thereof may be freely changed, and the component layout configuration thereof may be more complex.

Embodiment 1

This embodiment provides a component polarity detection method, the method includes: selecting first component symbols similar to graphs in a pre-created template library of component polarity symbols from a polar graph layer of a to-be-detected PCB, and sifting out second component symbols each having polarity from the selected first component symbols; and traversing each second component symbol having polarity, to detect whether a polarity symbol that has been already stored in the template library is in the second component symbol having polarity; if yes, examining whether a polarity position of the polarity symbol in the second component symbol is correct; and if the polarity position is incorrect, outputting a report indicating that the polarity position of the polarity symbol in the second component symbol is incorrect.

Figure 2A:
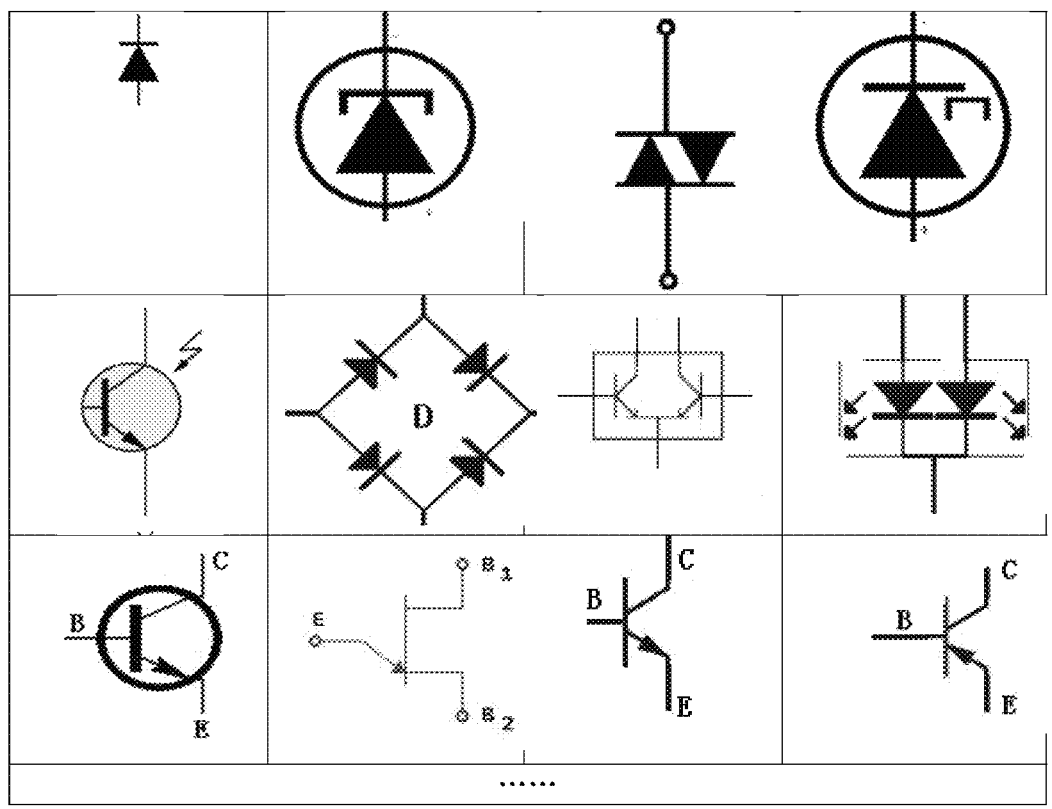
FIG. 2A is a schematic diagram of multiple types of component symbols in the present disclosure.
Figure 2B:
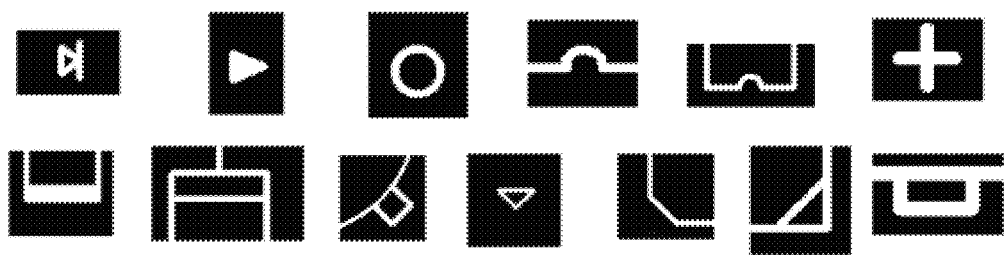
FIG. 2B is a schematic diagram of multiple types of component polarity symbols in the present disclosure.

The component polarity detection method provided in this embodiment is described in detail below with reference to the drawings. Referring to FIG. 1A, which is a schematic flowchart of the component polarity detection method in an embodiment. As shown in FIG. 1A, the component polarity detection method specifically includes the following several operations:

S11: Creating a template library of the component polarity symbols. In this embodiment, the template library of the component polarity symbols includes component graphs and component polarity symbols. FIG. 2A is a schematic diagram of multiple types of component symbols, and FIG. 2B is a schematic diagram of multiple types of component polarity symbols.

S12: Selecting first component symbols similar to graphs in the pre-created template library of component polarity symbols from a polar graph layer of a to-be-detected PCB, and sifting out second component symbols each having polarity from the selected first component symbols.

In this embodiment, the first component symbols similar to the graphs in the pre-created template library of component polarity symbols are selected from the polar graph layer of the to-be-detected PCB by using multiple types of graph similarity algorithms. A graph similarity between a component symbol in the polar graph layer of the to-be-detected PCB and the selected first component symbol reaches a similarity threshold. For example, the similarity threshold is 90%.

In this embodiment, all component symbols in the polar graph layer of the to-be-detected PCB are called the first component symbols. A component symbol having a polarity symbol in the first component symbols is called the second component symbol. For example, component symbols such as a diode, a MOS transistor, an IC chip, a resistor, an inductor, and the like in the polar graph layer of the to-be-detected PCB are the first component symbols. The diode, the MOS transistor, the IC chip, and the like each has a polarity symbol. Therefore, the diode, the MOS transistor, the IC chip, and the like that are sifted out are the second component symbols.

In this embodiment, the second component symbols each having polarity are sifted out from the selected first component symbols according to an attribute of a BOM (Bill of Material). The attribute of the BOM includes that a component has a polarity attribute or a component does not have the polarity attribute. For example, resistor components, inductor components and the like do not have the polarity attribute, and components such as diodes, triodes, and MOS transistors have the polarity attribute.

Alternatively, the second component symbols each having polarity are sifted out from the selected first component symbols according to the name prefix of the received component. For example, the received components with name prefixes of U and D, such as U1, U2, and D1, are components each having polarity, and components with name prefixes of R and L, such as resistors R1 and R2 and inductors L1 and L2, are components each having no polarity.

S13: Traversing each second component symbol having polarity, to detect whether a polarity symbol that has been already stored in the template library is in the second component symbol having polarity; if yes, examining whether the polarity position of the polarity symbol in the second component symbol is correct; and if the polarity position is incorrect, outputting a report indicating that the polarity position of the polarity symbol in the second component symbol is incorrect; or if the polarity position is correct, continuing to examine, based on an arrangement order of components in the polar graph layer of the to-be-detected PCB, whether the polarity position of the polarity symbol in the next second component symbol is correct. If a polarity symbol that has been already stored in the template library is not in the second component symbol having polarity, that is, if no polarity symbol is in the second component symbol having polarity, outputting a report indicating a lack of a polarity symbol; or if a polarity symbol that has not been stored in the template library is in the second component symbol having polarity, outputting an addition instruction, to add the polarity symbol that has not been stored to the template library.

Still referring to FIG. 1, as shown in FIG. 1, S13 specifically includes the following several operations:

S131: Detecting whether a polarity symbol that has been already stored in the template library is in the second component symbol having polarity, and if yes, performing operation S132, or if the polarity symbol does not exist, performing S133.

S132: Examining whether the polarity position of the polarity symbol in the second component symbol is correct. If the polarity position is correct, continuing to examine, based on the arrangement order of the components in the polar graph layer of the to-be-detected PCB, whether the polarity position of the polarity symbol in the next second component symbol is correct, until all components each having a polarity symbol are examined. If the polarity position is incorrect, performing operation S134 of outputting a report indicating that the polarity position of the polarity symbol in the second component symbol is incorrect.

Specifically, S132 includes: determining whether the second component symbol is a bi-pin component symbol; if the second component symbol is a bi-pin component symbol, examining whether the polarity position of the polarity symbol in the second component symbol is correct according to the polarity symbol in the bi-pin component symbol and the polarity direction; if the polarity position is correct, continuing to examine whether the polarity position of the polarity symbol in the next second component symbol is correct; and if the polarity position is incorrect, outputting a report indicating that the polarity position of the polarity symbol in the second component symbol is incorrect; if the second component symbol is not a bi-pin component symbol, detecting whether the polarity symbol and the polarity pin in the non-bi-pin component symbol are located in the same location area, to examine whether the polarity position of the polarity symbol in the second component symbol is correct; if the polarity symbol and the polarity pin are located in the same location area, determining that the polarity position of the polarity symbol in the second component symbol is correct; if the polarity symbol and the polarity pin are not located in the same location area, determining that the polarity position of the polarity symbol in the second component symbol is incorrect, and outputting a report indicating that the polarity position of the polarity symbol in the second component symbol is incorrect. The polarity pin is the first pin of a non-bi-pin component by default.

Figure 3A:
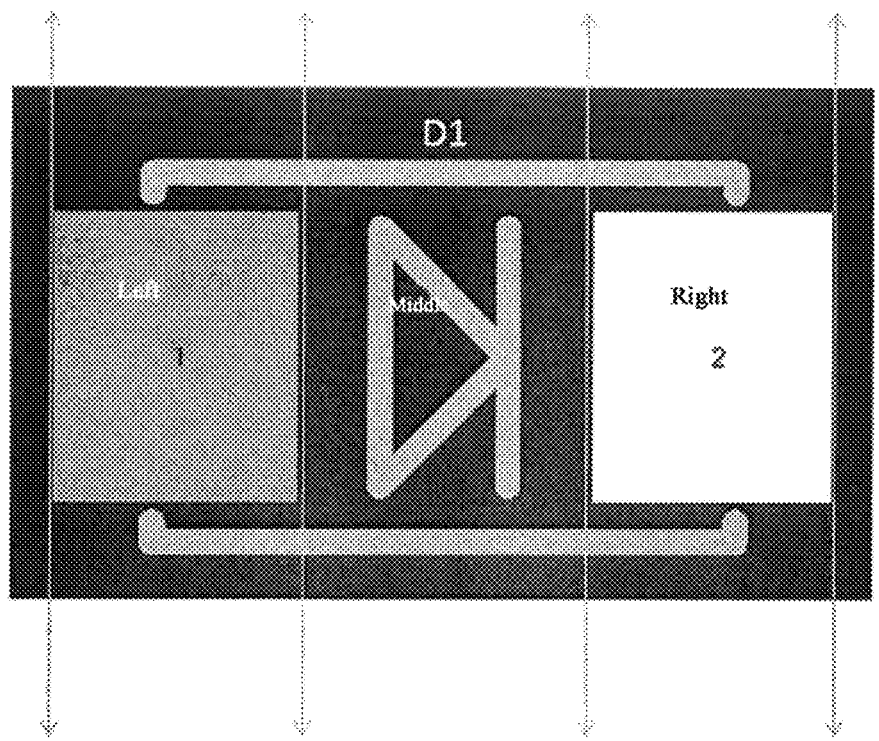
FIG. 3A is a diagram of a component symbol of a diode in the present disclosure.

For example, the bi-pin component symbol includes a symbol of a diode D. The symbol of the diode D is divided into left, middle, and right areas. If the polarity symbol of the found diode D has the polarity direction, the polarity position is examined based on the polarity direction in priority. FIG. 3A is a diagram of the component symbol of a diode. As shown in FIG. 3A, D1 is toward the right, and the second pin of the diode is required to be the polarity direction, so that it is examined that the polarity position of the polarity symbol in the symbol of the diode is correct. Alternatively, if the polarity symbol has no direction, the polarity symbol of D1 is located in the middle, and the polarity pin 2 of the component is located on the right, it is examined that the polarity position of the polarity symbol in the symbol of the diode is incorrect, and the positions are inconsistent, then a report indicating that the polarity position of the polarity symbol in the symbol of the diode is incorrect is output.

Figure 3B:
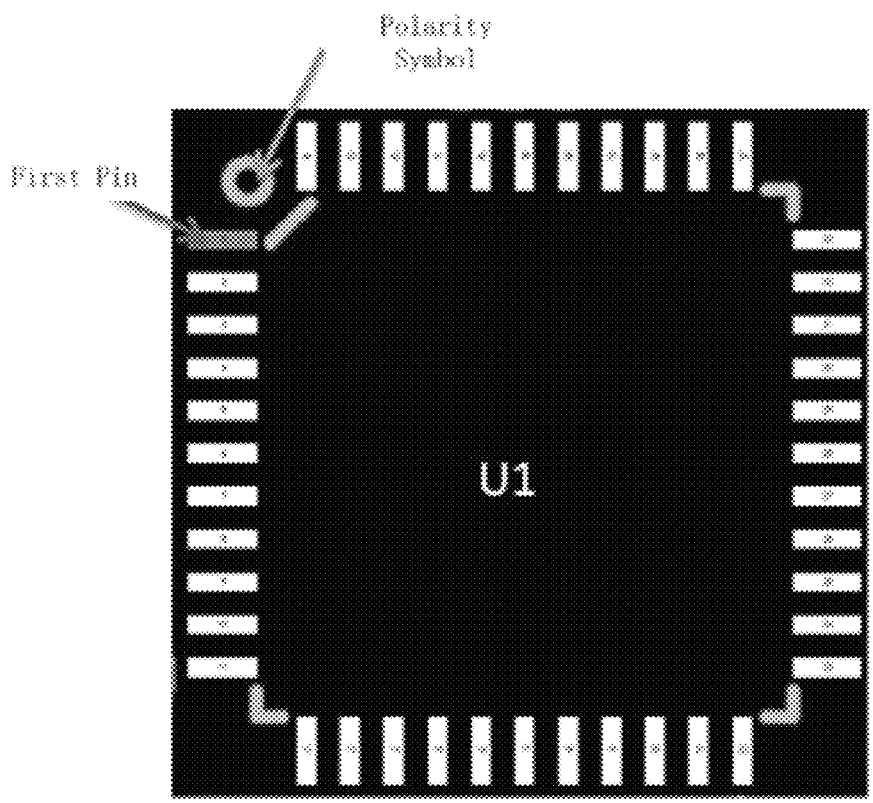
FIG. 3B is a symbol diagram of a multi-pin component symbol U1 in the present disclosure.
Figure 3C:
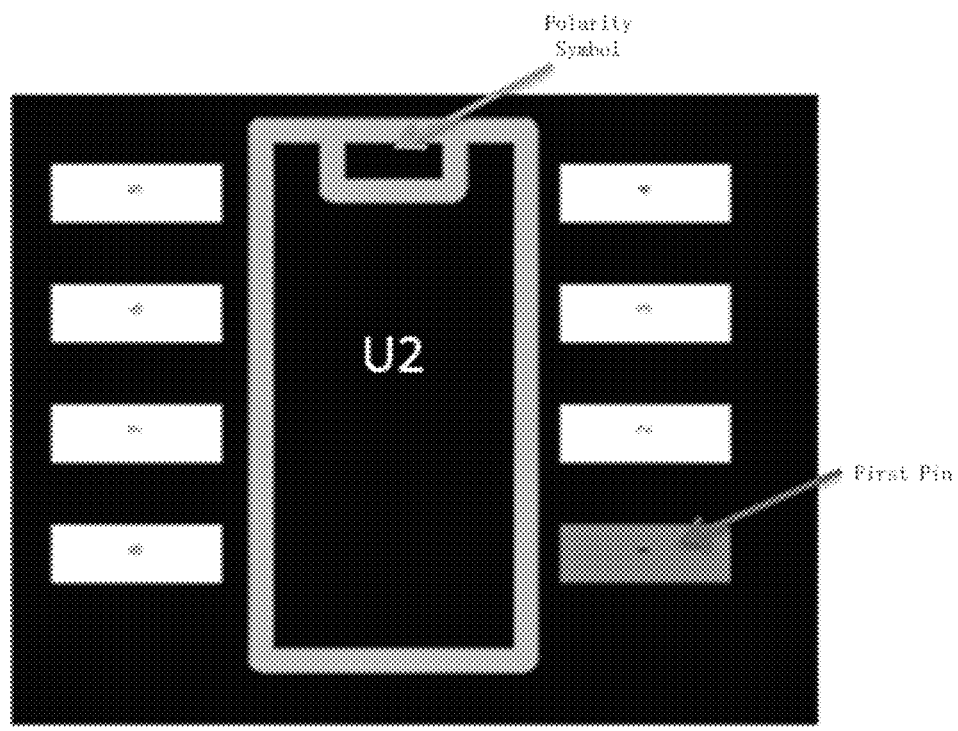
FIG. 3C is a symbol diagram of a multi-pin component symbol U2 in the present disclosure.

FIG. 3B is a symbol diagram of a multi-pin component symbol U1, and FIG. 3C is a symbol diagram of a multi-pin component symbol U2. As shown in FIG. 3B, the position of the polarity symbol and the first pin in the multi-pin component symbol U1 are located in the same location area (as shown in FIG. 3B, the location area is an upper left area), then it is examined that the polarity position of the polarity symbol in the second component symbol is correct.

As shown in FIG. 3C, the position of the polarity symbol and the first pin in the multi-pin component symbol U2 are located in different location areas (as shown in FIG. 3C, the polarity symbol is located in an upper middle area, and the first pin is located in a lower right area), then it is examined that the polarity position of the polarity symbol in the second component symbol is incorrect, and a report indicating that the polarity position of the polarity symbol in the second component symbol is incorrect is output.

S133: If it is detected that the polarity symbol that has been already stored in the template library is not in the second component symbol having polarity, that is, there is no polarity symbol in the second component symbol having polarity, then outputting a report indicating a lack of a polarity symbol; or if a polarity symbol that has not been stored in the template library is in the second component symbol having polarity, then outputting an addition instruction, to add the polarity symbol that has not been stored to the template library.

Figure 3D:
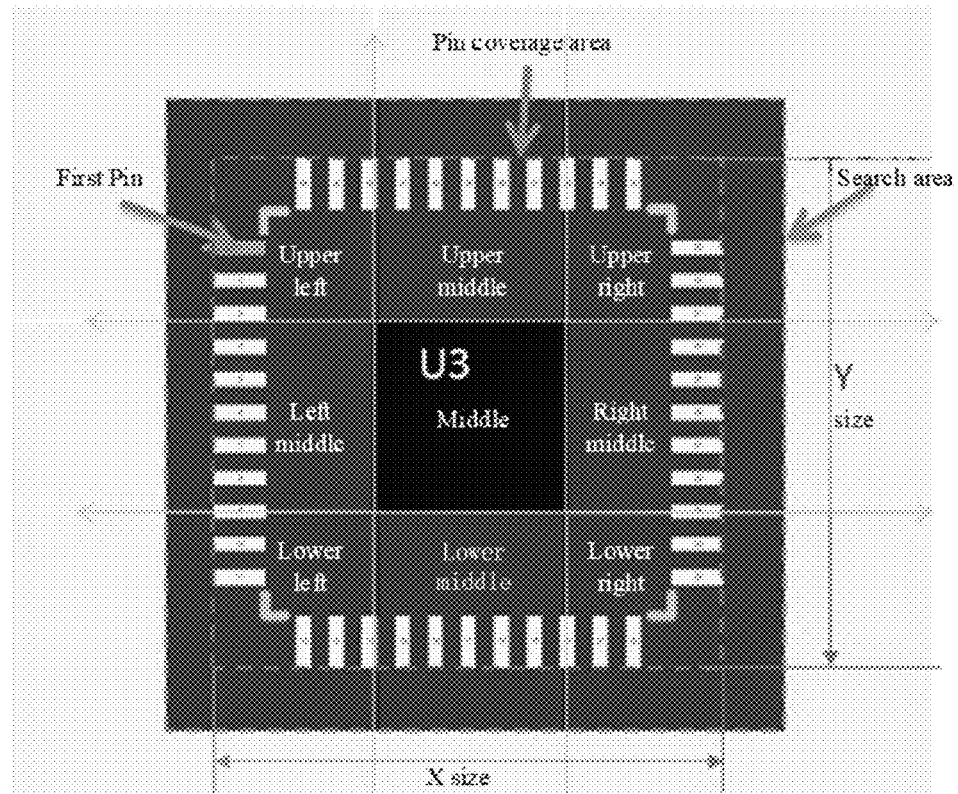
FIG. 3D is a symbol diagram of a multi-pin component symbol U3 in the present disclosure.

As shown in FIG. 3D, a multi-pin component symbol U3 is divided into upper left, upper middle, upper right, left middle, middle, right middle, lower left, lower middle, and lower right areas based on ⅓ of X and ⅓ of Y. U3 in FIG. 3D is then traversed, and if there is no polarity symbol in the search area, then directly reporting that there is no polarity symbol in U3.

In this embodiment, the location area is divided in a graph of a component body. For example, the area (referring to a pin coverage area in FIG. 3D) of a component body of U3 is increased by a range of 10% (10% may be set), that is, 110% of the maximum area of the component body (referring to the search area in FIG. 3D). The component body size depends on the actual size of a physical model library in priority. If there is no physical model library, the size of a component body box in CAD is used. If there is no component body box in CAD, the body size is calculated based on coverage areas of all pins of the component.

Performing the component polarity detection method provided in this embodiment, and turning manual examination into computer big data analysis, so that examination efficiency and correctness are improved, and the working environment of engineers is greatly improved. It is an important phase for implementing process examination automation. A PCB having 1000 components is used as an example. If polar components approximately account for 10%, that is, there are 100 polar components, and it takes 10 seconds to manually check one polar component, it needs to take 16.7 minutes to manually check the 100 polar components. If there is a problem, a report is needed for summary, and an entire process needs to take approximately 30 minutes. However, if an engineer uses the method in the present disclosure currently, only 1 to 3 minutes are needed for implementation, not only efficiency is multiplied several times, but also burden of the engineer is greatly eased.

This embodiment further provides a computer-readable storage medium storing a computer program. When executed by a processor, the program implements the above-mentioned component polarity detection method. A person with ordinary skill in the art may understand that all or some of the operations of the method embodiments may be implemented by using computer program related hardware. The computer program may be stored in a computer-readable storage medium. When the program is executed, the operations of the method embodiments are performed. The foregoing storage medium includes: any medium that can store program code, such as a read only memory (ROM), a random access memory (RAM), a magnetic disk, an optical disc or the like.

The component polarity detection method and the computer-readable storage medium implementing the component polarity detection method of this embodiment improve component polarity detection efficiency, shorten the detection time, have a low error rate, and play an important role in promoting intelligentization of the electronic industry.

Embodiment 2

This embodiment provides a component polarity detection system. The system includes a selection module and a processing module. The selection module selects first component symbols similar to graphs in a pre-created template library of component polarity symbols from a polar graph layer of a to-be-detected PCB, and sifts out second component symbols each having polarity from the selected first component symbols. The processing module traverses each second component symbol having polarity, to detect whether a polarity symbol that has been already stored in the template library is in the second component symbol having polarity; if yes, the processing module examines whether a polarity position of the polarity symbol in the second component symbol is correct; and if the polarity position is incorrect, the processing module outputs a report indicating that the polarity position of the polarity symbol in the second component symbol is incorrect.

The component polarity detection system provided in this embodiment is described in detail below with reference to the drawings. It should be noted that, it should be understood that the division of modules in the system is merely a logical function division and during actual implementation, all or some of the modules may be integrated into one physical entity, or the modules may be separated physically. In addition, these modules may all be implemented in a form of invoking software by a processing element, or may all be implemented in a form of hardware; or some modules may be implemented in a form of invoking software by a processing element, and some modules may be implemented in a form of hardware. For example, an x module may be a processing element that is separately disposed, or may be integrated in a chip in the foregoing apparatus for implementation. In addition, the x module may be stored in a memory in the foregoing apparatus in a form of program code, and a function of the x module is invoked and performed by a processing element in the foregoing apparatus. Implementation of other modules is similar to that of the x module. In addition, all or some of these modules may be integrated together or may be implemented separately. The processing element herein may be an integrated circuit (IC) and have the signal processing capability. In an implementation process, operations in the foregoing methods or the foregoing modules can be implemented by using a hardware integrated logical circuit in a processor element, or by using instructions in a form of software.

For example, these modules may be one or more ICs configured to implement the foregoing method, for example, one or more Application Specific Integrated Circuit (ASIC), one or more Digital Signal Processor (DSP), one or more Field Programmable Gate Array (FPGA), or the like. For another example, when a module is implemented in a form of invoking program code by a processing element, the processing element may be a general purpose processor, for example, a Central Processing Unit (CPU) or other processors that can invoke program code. For another example, these modules may be integrated together and implemented in a form of a system-on-a-chip (SOC).

Figure 4:
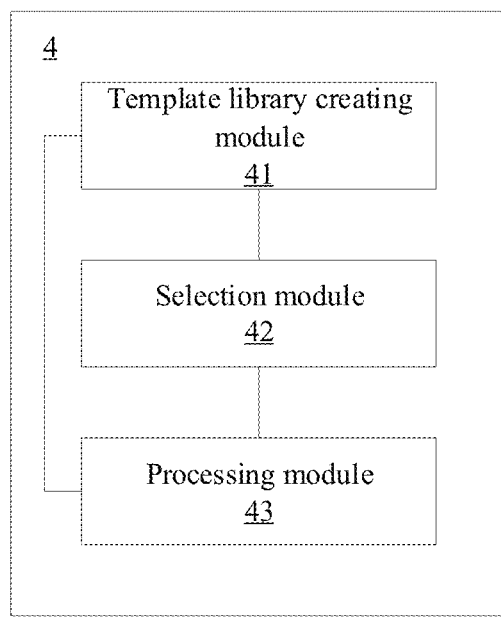
FIG. 4 is a schematic principle structural diagram of a component polarity detection system according to an embodiment of the present disclosure.

FIG. 4 is a schematic principle structural diagram of a component polarity detection system in an embodiment. As shown in FIG. 4, the component polarity detection system 4 includes a template library creation module 41, a selection module 42, and a processing module 43.

The template library creation module 41 is configured to create a template library of the component polarity symbols. The selection module 42 coupled with the template library creation module 41 selects first component symbols similar to graphs in the pre-created template library of component polarity symbols from a polar graph layer of a to-be-detected PCB, and sifts out second component symbols each having polarity from the selected first component symbols.

In this embodiment, the selection module 42 selects the first component symbols similar to the graphs in the pre-created template library of component polarity symbols from the polar graph layer of the to-be-detected PCB by using multiple types of graph similarity algorithms. The graph similarity between a component symbol in the polar graph layer of the to-be-detected PCB and the selected first component symbol reaches a similarity threshold. For example, the similarity threshold is 90%. In this embodiment, all component symbols in the polar graph layer of the to-be-detected PCB are called the first component symbols. The component symbol having the polarity symbol in the first component symbols is called the second component symbol.

In this embodiment, the selection module 42 sifts out the second component symbols each having polarity from the selected first component symbols according to an attribute of a BOM. Alternatively, the selection module 42 sifts out the second component symbols each having polarity from the selected first component symbols according to the name prefix of the received component.

The processing module 43 coupled with the template library creation module 41 and the selection module 42 is configured to: traverse each second component symbol having polarity, to detect whether a polarity symbol that has been already stored in the template library is in the second component symbol having polarity; if yes, examine whether the polarity position of the polarity symbol in the second component symbol is correct; and if the polarity position is incorrect, output a report indicating that the polarity position of the polarity symbol in the second component symbol is incorrect; if the polarity position is correct, continue to examine whether the polarity position of the polarity symbol in the next second component symbol is correct based on an arrangement order of components in the polar graph layer of the to-be-detected PCB.

Specifically, the processing module 43 detects whether a polarity symbol that has been already stored in the template library is in the second component symbol having polarity, and if it is detected that the polarity symbol that has been already stored in the template library is in the second component symbol having polarity, then examining whether the polarity position of the polarity symbol in the second component symbol is correct. If the polarity position is correct, continuing to examine whether the polarity position of the polarity symbol in a next second component symbol is correct based on an arrangement order of components in the polar graph layer of the to-be-detected PCB, until all components each having a polarity symbol are examined. If the polarity position is incorrect, outputting a report indicating that the polarity position of the polarity symbol in the second component symbol is incorrect. If it is detected that a polarity symbol that has been already stored in the template library is not in the second component symbol having polarity, that is, there is no polarity symbol in the second component symbol having polarity, then outputting a report indicating a lack of a polarity symbol; or if a polarity symbol that has not been stored in the template library is in the second component symbol having polarity, then outputting an addition instruction, to add the polarity symbol that has not been stored to the template library.

The processing module 43 is further configured to: determine whether the second component symbol is a bi-pin component symbol; if the second component symbol is a bi-pin component symbol, examine whether the polarity position of the polarity symbol in the second component symbol is correct according to the polarity symbol in the bi-pin component symbol and the polarity direction; if the polarity position is correct, continue to examine whether the polarity position of the polarity symbol in the next second component symbol is correct; and if the polarity position is incorrect, output a report indicating that the polarity position of the polarity symbol in the second component symbol is incorrect; if the second component symbol is not a bi-pin component symbol, detect whether the polarity symbol and the polarity pin in the non-bi-pin component symbol are located in the same location area, to examine whether the polarity position of the polarity symbol in the second component symbol is correct; if the polarity symbol and the polarity pin are located in the same location area, determine that the polarity position of the polarity symbol in the second component symbol is correct; if the polarity symbol and the polarity pin are not located in the same location area, determine that the polarity position of the polarity symbol in the second component symbol is incorrect, and output a report indicating that the polarity position of the polarity symbol in the second component symbol is incorrect. The polarity pin is the first pin of a non-bi-pin component by default.

In this embodiment, the processing module 43 stops running when all the components each having a polarity symbol are examined.

Embodiment 3

This embodiment provides an apparatus. The apparatus includes a processor, a memory, a transceiver, a communication interface, and a system bus. The memory and the communication interface are connected to the processor and the transceiver by using the system bus, to complete mutual communication. The memory is configured to store a computer program. The communication interface is configured to communicate with other apparatuses. The processor and the transceiver are configured to run the computer program, to cause the apparatus to perform the operations of the component polarity detection method.

The system bus mentioned above may be a Peripheral Component Interconnect (PCI) bus, an Extended Industry Standard Architecture (EISA) bus, or the like. The system bus may be classified into an address bus, a data bus, a control bus, and the like. For ease of representation, only one bold line is used to represent the bus in the figure, but this does not mean that there is only one bus or only one type of bus. The communication interface is configured to implement communication between a database access apparatus and other devices (for example, a client, a read/write library, and a read-only library). The memory may include a RAM, and may further include a non-volatile memory, for example, at least one magnetic disk memory.

The processor may be a general purpose processor including a CPU, a Network Processor (NP), or the like; or may be a DSP, an ASIC, an FPGA, or other components such as a programmable logical device, a discrete gate, a transistor logical device, or a discrete hardware component.

In conclusion, the method, system and apparatus for detecting polarity of component, and the computer-readable storage medium consistent with the present disclosure improve component polarity detection efficiency, shorten the detection time, have a low error rate, and play an important role in promoting intelligentization of the electronic industry. Therefore, the present disclosure effectively overcomes various disadvantages and has high industrial utilization value.

The above-mentioned embodiments are just used for exemplarily describing the principle and effects of the present disclosure instead of limiting the present disclosure. One skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A component polarity detection method, comprising:
    selecting first component symbols similar to graphs in a pre-created template library of component polarity symbols from a polar graph layer of a to-be-detected printed circuit board (PCB), and sifting out second component symbols each having polarity from the selected first component symbols; and
    traversing each second component symbol having polarity, to detect whether a polarity symbol that has been already stored in the template library is in the second component symbol having polarity; if yes, examining whether a polarity position of the polarity symbol in the second component symbol is correct; and if the polarity position is incorrect, outputting a report indicating that the polarity position of the polarity symbol in the second component symbol is incorrect.

2. The component polarity detection method as in claim 1, wherein before selecting the first component symbols similar to the graphs in the pre-created template library of the component polarity symbols from the polar graph layer of the to-be-detected PCB, the component polarity detection method further comprises: creating the template library of the component polarity symbols.

3. The component polarity detection method as in claim 1, wherein a graph similarity between a component symbol in the polar graph layer of the to-be-detected PCB and the selected first component symbol reaches a similarity threshold.

4. The component polarity detection method as in claim 1, further comprising:
    sifting out the second component symbols each having polarity from the selected first component symbols according to an attribute of a bill of material (BOM); or
    sifting out the second component symbols each having polarity from the selected first component symbols according to a name prefix of a received component.

5. The component polarity detection method as in claim 1, wherein detecting that the polarity symbol that has been already stored in the template library is not in the second component symbol having polarity comprises:
    no polarity symbol is in the second component symbol having polarity; or
    a polarity symbol that has not been stored in the template library is in the second component symbol having polarity.

6. The component polarity detection method as in claim 5, wherein
    if no polarity symbol is in the second component symbol having polarity, outputting a report indicating a lack of the polarity symbol; or
    if the polarity symbol that has not been stored in the template library is in the second component symbol having polarity, outputting an addition instruction to add the polarity symbol that has not been stored to the template library.

7. The component polarity detection method as in claim 5, wherein examining whether the polarity position of the polarity symbol in the second component symbol is correct comprises:
    determining whether the second component symbol is a bi-pin component symbol; if the second component symbol is a bi-pin component symbol, examining whether the polarity position of the polarity symbol in the second component symbol is correct according to the polarity symbol and a polarity direction of the bi-pin component symbol; if the polarity position is correct, continuing to examine whether the polarity position of the polarity symbol in the next second component symbol is correct; and if the polarity position is incorrect, outputting a report indicating that the polarity position of the polarity symbol in the second component symbol is incorrect; if the second component symbol is not a bi-pin component symbol, detecting whether the polarity symbol and a polarity pin in the non-bi-pin component symbol are located in a same location area, to examine whether the polarity position of the polarity symbol in the second component symbol is correct; if the polarity symbol and the polarity pin are located in the same location area, determining that the polarity position of the polarity symbol in the second component symbol is correct; if the polarity symbol and the polarity pin are not located in the same location area, determining that the polarity position of the polarity symbol in the second component symbol is incorrect, and outputting a report indicating that the polarity position of the polarity symbol in the second component symbol is incorrect; wherein the polarity pin is a first pin of a non-bi-pin component by default.

8. A non-transitory computer-readable storage medium, storing a computer program, wherein when executed by a processor, the program implements a component polarity detection method as in claim 1.

9. An apparatus, comprising a processor and a memory, wherein the memory is configured to store a computer program, and the processor is configured to execute the computer program stored in the memory, to cause the apparatus to perform a component polarity detection method as in claim 1.

10. A component polarity detection system, comprising:
a selection module, configured to: select first component symbols similar to graphs in a pre-created template library of component polarity symbols from a polar graph layer of a to-be-detected printed circuit board (PCB), and sift out second component symbols each having polarity from the selected first component symbols; and
a processing module, configured to: traverse each second component symbol having polarity, to detect whether a polarity symbol that has been already stored in the template library is in the second component symbol having polarity; if yes, examine whether a polarity position of the polarity symbol in the second component symbol is correct; and if the polarity position is incorrect, output a report indicating that the polarity position of the polarity symbol in the second component symbol is incorrect.

* * * * *